United States Patent
Rodriguez

(10) Patent No.: US 9,625,246 B2
(45) Date of Patent: Apr. 18, 2017

(54) MEASURING APPARATUS

(71) Applicant: David Rodriguez, Edinburg, TX (US)

(72) Inventor: David Rodriguez, Edinburg, TX (US)

( * ) Notice: Subject to any disclaimer, the term of this patent is extended or adjusted under 35 U.S.C. 154(b) by 99 days.

(21) Appl. No.: 14/622,239

(22) Filed: Feb. 13, 2015

(65) Prior Publication Data

US 2015/0226534 A1    Aug. 13, 2015

Related U.S. Application Data

(60) Provisional application No. 61/939,496, filed on Feb. 13, 2014.

(51) Int. Cl.
*G01B 3/30* (2006.01)
*G01B 3/38* (2006.01)
*G01B 3/34* (2006.01)

(52) U.S. Cl.
CPC ........ *G01B 3/38* (2013.01); *G01B 3/34* (2013.01)

(58) Field of Classification Search
CPC ... G01B 3/16; G01B 3/30; G01B 3/34; G01B 3/38
USPC ... 33/501.45, 501.06, 501.02, 501.05, 501.3, 33/501.11
See application file for complete search history.

(56) References Cited

U.S. PATENT DOCUMENTS

| | | | | |
|---|---|---|---|---|
| 387,284 A * | 8/1888 | Dupee | ............... | G01B 3/30 33/562 |
| 741,146 A * | 10/1903 | Labofish | ............. | G01B 3/30 33/562 |
| 1,389,486 A * | 8/1921 | Brewer | ............... | G01B 3/34 33/562 |
| 3,318,006 A * | 5/1967 | Martinez | ............. | G07D 9/04 33/562 |
| 4,584,774 A * | 4/1986 | Link | .................. | G01B 3/30 33/202 |
| 5,584,125 A * | 12/1996 | Prete | ................. | G01B 3/38 33/501.45 |
| 5,685,085 A * | 11/1997 | Bond | ................. | G01B 3/42 33/520 |
| 5,875,558 A * | 3/1999 | Bakke | ............... | G01B 3/38 33/199 R |
| 6,901,672 B1 * | 6/2005 | Reilly | ............... | G01B 3/30 33/501.45 |
| 7,188,430 B2 * | 3/2007 | Tange | .............. | G01B 3/306 33/501.45 |
| 7,603,787 B1 * | 10/2009 | Butler, III | ........ | B07C 1/10 33/501.45 |

(Continued)

*Primary Examiner* — Yaritza Guadalupe-McCall

(57) ABSTRACT

A measuring device for measuring nuts, bolt heads, washers and the like that includes a body having a first end, an opposing second end, and a longitudinal reference line extending between the first end and the second end; a first pair of parallel surfaces of equal length, the first pair of opposing parallel surfaces longitudinally between the first end and the second end, the surfaces of the first pair spaced apart by a first distance; a second pair of parallel surfaces of equal length, the second pair of parallel surfaces longitudinally between the first pair of parallel surfaces and the first end, the surfaces of the second pair spaced apart by a second distance that is smaller than the first distance; and a pair of nonparallel surfaces connected at an obtuse angle, the opposing nonparallel surfaces longitudinally between the second pair of opposing parallel surfaces and the first end.

4 Claims, 3 Drawing Sheets

(56) References Cited

U.S. PATENT DOCUMENTS

| | | | | |
|---|---|---|---|---|
| 8,006,405 B2* | 8/2011 | Hu | ................... | G01B 3/166 33/679.1 |
| 2008/0276475 A1* | 11/2008 | Schafer | ................ | G01B 3/34 33/501.45 |
| 2015/0226534 A1* | 8/2015 | Rodriguez | ........... | G01B 3/34 33/501.45 |

* cited by examiner

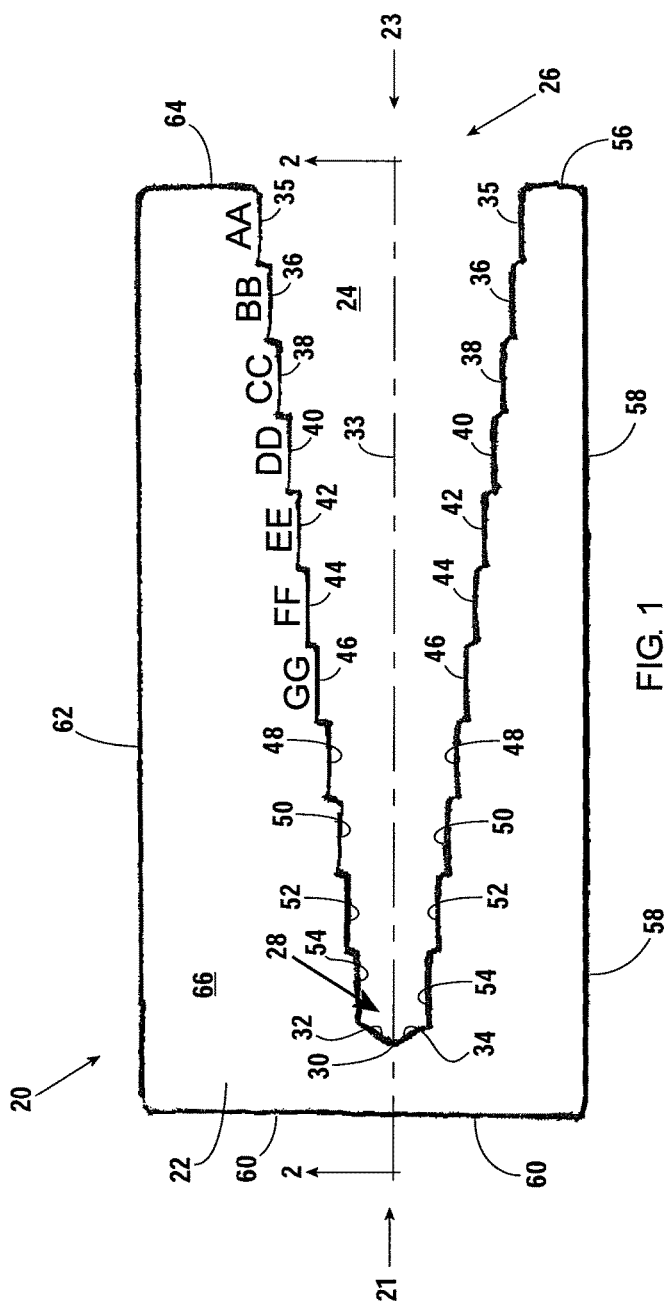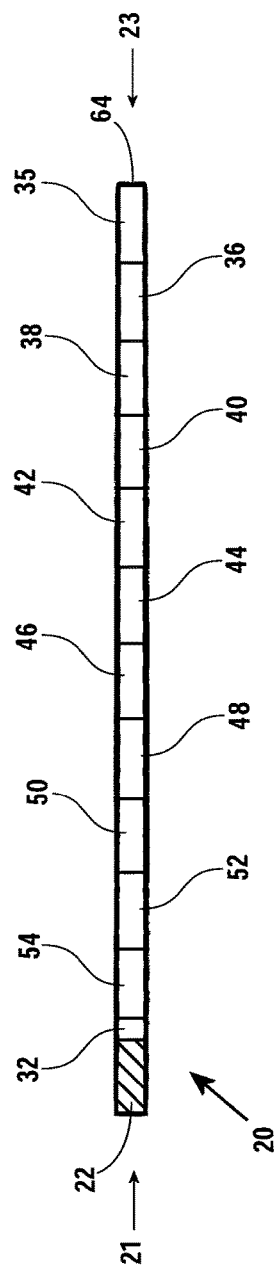

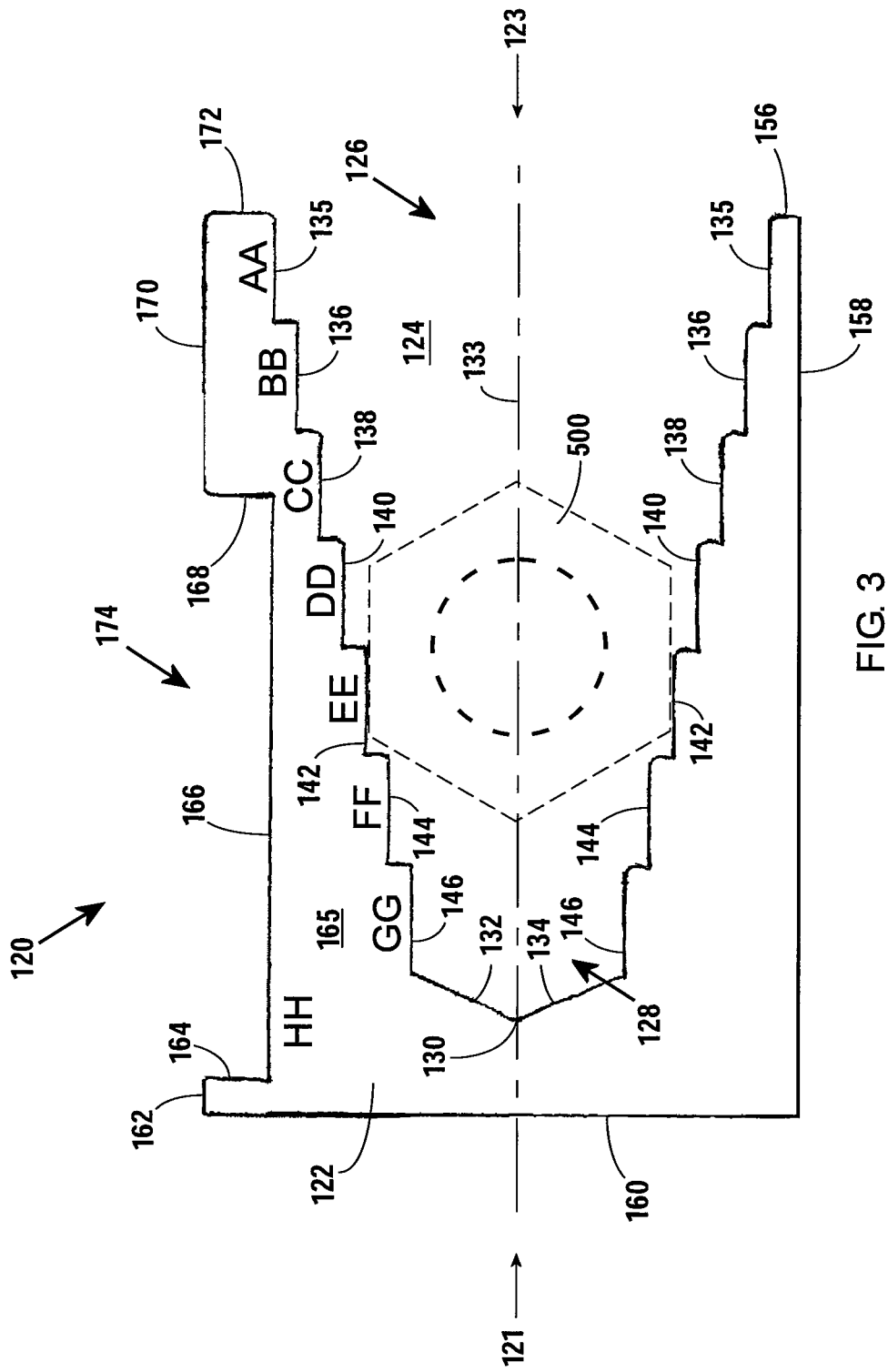

MEASURING APPARATUS

CROSS-REFERENCE TO RELATED APPLICATIONS

This original non-provisional application claims the benefit of and priority to U.S. provisional application 61/939,496, filed Feb. 13, 2014, which is incorporated by reference.

FEDERALLY-SPONSORED RESEARCH

Not applicable.

BACKGROUND OF THE INVENTION

1. Field of the Invention

This application relates to fasteners. More specifically, the application relates to a measuring device for nuts, bolt heads, washers and other small tools.

2. Background of the Related Art

In the mechanical arts, it is often necessary to quickly and accurately measure the size of nuts, bolt heads, or other fasteners (or fastening tools). Often, however, a measuring tool is not handy because it is bulky or because it is located elsewhere. This results in additional time (relative to having the tool on person) required for a technician or mechanic to size the fastener. In some cases, the technician might simply guess at the size, which could result in inadvertently damaging the fastener by using a wrong-sized driver. It would therefore be helpful to have available a compact and versatile measuring apparatus for quickly determining the size of fasteners.

SUMMARY OF THE INVENTION

The present invention is a measuring device for measuring nuts, bolt heads, washers and the like. The invention includes a body having a first end, an opposing second end, and a longitudinal reference line extending between the first end and the second end; a first pair of parallel surfaces of equal length, the first pair of opposing parallel surfaces longitudinally between the first end and the second end, the surfaces of the first pair spaced apart by a first distance; a second pair of parallel surfaces of equal length, the second pair of parallel surfaces longitudinally between the first pair of parallel surfaces and the first end, the surfaces of the second pair spaced apart by a second distance that is smaller than the first distance; and a pair of nonparallel surfaces connected at an obtuse angle, the opposing nonparallel surfaces longitudinally between the second pair of opposing parallel surfaces and the first end.

BRIEF SUMMARY OF THE DRAWINGS

FIG. 1 is a top view of a first embodiment of the invention.

FIG. 2 is a side view of the first embodiment through section line 2-2 of FIG. 1.

FIG. 3 is a top view of a second embodiment of the invention.

DETAILED DESCRIPTION OF THE VARIOUS EMBODIMENTS

Figure 4:
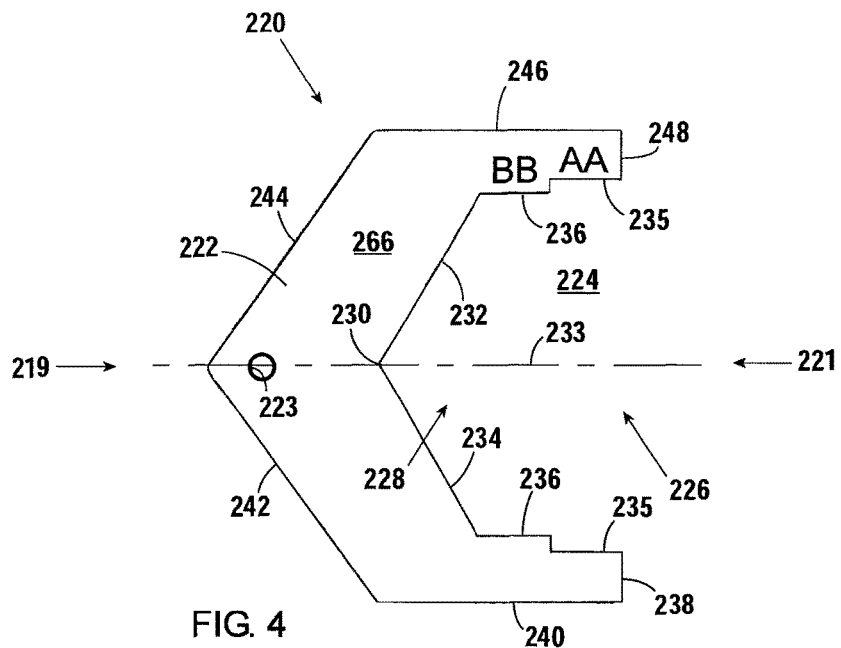
FIG. 4 is a top view of a third embodiment of the invention.

FIGS. 1-2 show a first embodiment 20 of the invention. The embodiment 20 is a generally "U"-shaped, metal body 22 having a first end 21 and a second end 23. The body 22 defines an interior cavity 24 having an open end 26 and a closed end 28. The cavity 24 is widest at the open end 26 and narrows toward the closed end 28, which is coterminal with a junction 30 of two rectangular walls 32, 34 angled 120-degrees apart. The cavity 24 is symmetrical about a longitudinal line 33 that intersects the junction 30 and extends between the first end 21 and second end 23.

The cavity 24 is partially defined by a plurality of parallel surfaces. The surfaces are arranged in opposing pairs, with both surfaces of each pair being identical in length. A first pair of surfaces 35 is adjacent to the open end 26 of the cavity 24 with the surfaces 35 spaced a first distance from one another. A second pair of surfaces 36 is longitudinally positioned between the first pair of surfaces 35 and the closed end 28 with the surfaces 36 spaced a second distance from one another, which is less than the first distance. A third pair of surfaces 38 is longitudinally positioned between the second pair of surfaces 36 and the closed end 28 with the surfaces 38 spaced a third distance from one another, which is less than the second distance. A fourth pair of surfaces 40 is longitudinally positioned between the third pair of surfaces 38 and the closed end 28 with the surfaces 40 spaced a fourth distance from one another, which is less than the third distance. A fifth pair of surfaces 42 is longitudinally positioned between the fourth pair of surfaces 40 and the closed end 28 with the surfaces 42 spaced a fifth distance from one another, which is less than the fourth distance. A sixth pair of surfaces 44 is longitudinally positioned between the fifth pair of surfaces 42 and the closed end 28 with the surfaces 44 spaced a sixth distance from one another, which is less than the fifth distance. A seventh pair of surfaces 46 is longitudinally positioned between the sixth pair of surfaces 44 and the closed end 28 with the surfaces 46 spaced a seventh distance from one another, which is less than the sixth distance. An eighth pair of surfaces 48 is longitudinally positioned between the seventh pair of surfaces 46 and the closed end 28 with the surfaces 48 spaced an eighth distance from one another, which is less than the seventh distance. A ninth pair of surfaces 50 is longitudinally positioned between the eighth pair of surfaces 48 and the closed end 28 with the surfaces 50 spaced a ninth distance from one another, which is less than the eighth distance. A tenth pair of surfaces 52 is longitudinally positioned between the ninth pair of surfaces 50 and the closed end 28 with the surfaces 52 spaced a tenth distance from one another, which is less than the ninth distance. An eleventh pair of surfaces 54 is longitudinally positioned between the tenth pair of surfaces 52 and the closed end 28 with the surfaces 54 spaced an eleventh distance from one another, which is less than the tenth distance.

In this embodiment, each surface of any of the pairs of surfaces is equidistant from the longitudinal line 33. For example, the distance between each surface of the first pair of surfaces 35 is twice the distance from either surface 35 to the longitudinal line 33.

The body 22 has an outside perimeter defined by five straight side surfaces. A first side surface 56 is adjacent to the first pair of surfaces 35. A second side surface 58 is connected to the first side surface 56 at a right angle. A third side surface 60 is connected to the second side surface 58 at a right angle. A fourth side surface 62 is connected to the third side surface 60 at a right angle. A fifth side surface 64 is connected to the fourth side surface 62 at a right angle and is adjacent to the first pair of surfaces 35. The fifth side surface 64 is coplanar with the first side surface 56.

The body 22 includes a planar top surface 66 adjacent and connected to the side surfaces 56, 58, 60, 62, 64 and the pairs of opposing parallel surfaces that border the cavity 24. Markings are located on the top surface proximal to each surface defining the channel (e.g., in FIG. 1, "AA," "BB," etc.). Each marking corresponds to the distance between the surfaces of each pair, thus allowing a user to quickly ascertain the size of item placed within the cavity 24.

FIG. 3 shows a second embodiment 120 of the invention. The embodiment 120 is a generally "U"-shaped, metal body 122 having a first end 121 and a second end 123. The body defines an interior cavity 124 having an open end 126 and a closed end 128. The cavity 124 is widest at the open end 126 and narrows toward the closed end 128, which is coterminal with a junction 130 of two rectangular walls 132, 134 angled 120-degrees apart. The cavity 124 is symmetrical about a longitudinal line 133 that intersects the junction 130 and extends between the first end 121 and second end 123.

The cavity 124 is partially defined by a plurality of parallel surfaces. The surfaces are arranged in opposing pairs, with both surfaces of each pair being identical in length. A first pair of surfaces 135 is adjacent to the open end 126 of the cavity 124 with the surfaces 135 spaced a first distance from one another. A second pair of surfaces 136 is longitudinally positioned between the first pair of surfaces 135 and the closed end 128 with the surfaces 136 spaced a second distance from one another, which is less than the first distance. A third pair of surfaces 138 is longitudinally positioned between the second pair of surfaces 136 and the closed end 128 with the surfaces 138 spaced a third distance from one another, which is less than the second distance. A fourth pair of surfaces 140 is longitudinally positioned between the third pair of surfaces 38 and the closed end 128 with the surfaces 140 spaced a fourth distance from one another, which is less than the third distance. A fifth pair of surfaces 142 is longitudinally positioned between the fourth pair of surfaces 140 and the closed end 128 with the surfaces 142 spaced a fifth distance from one another, which is less than the fourth distance. A sixth pair of surfaces 144 is longitudinally positioned between the fifth pair of surfaces 142 and the closed end 128 with the surfaces 144 spaced a sixth distance from one another, which is less than the fifth distance. A seventh pair of surfaces 146 is longitudinally positioned between the sixth pair of surfaces 144 and the closed end 128 with the surfaces 146 spaced a seventh distance, which is less than the sixth distance. In this embodiment 120, each surface of any of each pair of surface is equidistant from the line 133.

The body 122 has an outside perimeter defined by nine straight side surfaces. A first side surface 156 is adjacent to the first pair of surfaces 135. A second side surface 158 is connected to the first side surface 166 at a right angle. A third side surface 160 is connected to the second side surface 158 at a right angle. A fourth side surface 162 is connected to the third side surface 160 at a right angle. A fifth side surface 166 is connected to the fourth side surface 162. A sixth side surface 166 is connected to the fifth side surface 164 at a right angle. A seventh side surface 168 is connected to the sixth side surface 164 at a right angle. An eighth side surface 170 is connected to the seventh side surface 168 at a right angle. A ninth side surface 172 is connected to the eighth side surface 168 at a right angle and is connected to the first pair of surfaces 135. The fifth side surface 164, sixth side surface 166, and seventh side surface 168 define a notch 174 in one side of the body 122. The fifth side surface 164 and seventh side surface 168 are spaced apart an eighth distance, which is greater than the first distance.

The body 122 includes a planar top surface 165 adjacent and connected to the side surfaces and the pairs of opposing parallel surfaces that border the cavity 124. Markings are located on the top surface proximal to each surface defining the channel (e.g., in FIG. 3, "AA," "BB," etc.). Each marking corresponds to the distance between the surfaces of each pair—or in the case of "HH", the distances between surfaces 164 and 168—thus allowing a user to quickly ascertain the size of item placed within the cavity 124 or between surfaces 164 and 168.

FIG. 4 shows a third embodiment 220 of the invention. The embodiment 220 is a generally "U"-shaped, metal body 222 having a first end 219 and a second end 221. The body 222 defines an interior cavity 224 having an open end 226 and a closed end 228. The cavity 224 is widest at the open end 226 and narrows toward the closed end 228, which is coterminal with a junction 230 of two rectangular walls 232, 234 angled 120-degrees apart. The cavity 224 is symmetrical about a longitudinal line 233 that intersects the junction 230. A cylindrical surface 223 extends between and is adjacent to opposing sides of the body, which provides a hole for attachment to a keychain or the like.

The cavity 224 is partially defined by a plurality of parallel surfaces. The surfaces are arranged in opposing pairs, with both surfaces of each pair being identical in length. A first pair of surfaces 235 is adjacent to the open end 226 of the cavity 224 with the surfaces 235 are spaced a first distance from one another. A second pair of surfaces 236 is longitudinally positioned between the first pair of surfaces 235 and the closed end 228 with the surfaces 236 spaced a second distance from one another, which is less than the first distance.

The body 222 has an outside perimeter defined by sixth straight side surfaces. A first side surface 238 is adjacent to the first pair of surfaces 235. A second side surface 240 is connected to the first side surface 238 at a right angle. A third side surface 242 is connected to the second side surface 240. A fourth side surface 244 is connected to the third side surface 242. A fifth side surface 246 is connected to the fourth side surface 244 and parallel to the second side surface 240. A sixth side surface 248 is connected to the fifth side surface 246 at a right angle. The sixth side surface 246 is coplanar with the first side surface 238 and adjacent to the first pair of surfaces 235.

The body 222 includes a planar top surface 266 adjacent and connected to the side surfaces and the pairs of opposing parallel surfaces that border the cavity 224. Markings are located on the top surface proximal to each surface defining the channel (e.g., in FIG. 1, "AA," "BB," etc.). Each marking corresponds to the distance between the surfaces of each pair, thus allowing a user to quickly ascertain the size of item placed within the cavity 224.

Figure 5:
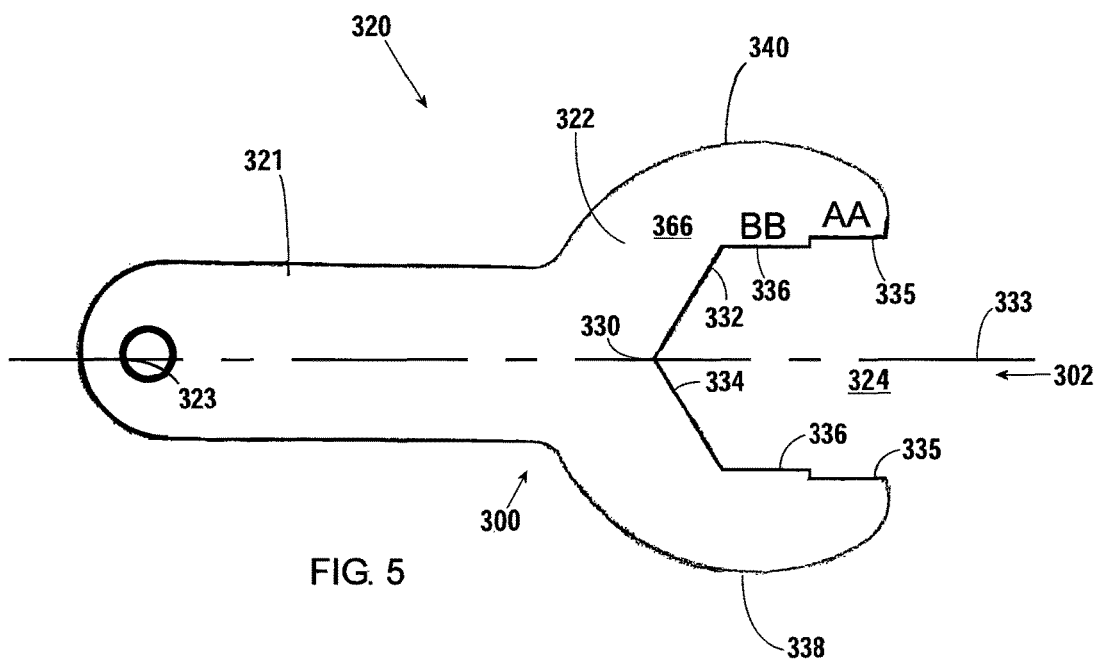
FIG. 5 is a top view of a fourth embodiment of the invention.

FIG. 5 shows a fourth embodiment 320 of the invention. The embodiment 320 is a generally C-shaped metal body 322 having a first end 300 and a second end 302. The body defines an interior cavity 324 having an open end 326 and a closed end 328. The cavity 324 is widest at the open end 326 and narrows toward the closed end 328, which is co-terminal with a junction 330 of two rectangular walls 332, 334 angled 120-degrees apart. The cavity 324 is symmetrical about a longitudinal line 333 that intersects the junction 230. A handle 321 is attached to the C-shaped body 322 opposite, and extends away from, the open end 326. A cylindrical surface 323 extends between and is adjacent to opposing sides of the body, which provides a hole for attachment to a keychain or the like.

The cavity 324 is partially defined by a plurality of parallel surfaces. The surfaces are arranged in opposing pairs, with both surfaces of each pair being identical in length. A first pair of surfaces 335 is adjacent to the open end 326 of the cavity 324 with the surfaces 335 spaced a first distance from one another. A second pair of surfaces 336 is longitudinally positioned between the first pair of surfaces 335 and the closed end 328 with the surfaces 336 spaced a second distance from one another, which is less than the first distance.

The body 322 has an outside perimeter defined by two partially-cylindrical side surfaces 338, 340 adjacent to the first pair of surfaces 335. The body 322 includes a planar top surface 366 adjacent and connected to the side surfaces 338, 340 and the pairs of opposing parallel surfaces 335, 336 that border the cavity 324. Markings are located on the top surface proximal to each surface defining the channel (e.g., in FIG. 1, "AA," "BB"). Each marking corresponds to the distance between the surfaces of each pair, thus allowing a user to quickly ascertain the size of item placed within the cavity 324.

Use of the invention is described with reference the embodiment shown in FIG. 3. A hex nut 500 may be longitudinally inserted into the cavity 124 and positioned so that opposing parallel sides abut one of the pair of surfaces. As shown in FIG. 3, the nut 500 abuts the fifth pair of surfaces 142, which are spaced apart a fifth distance corresponding to marking "EE."

Each of the described embodiments is sized to fit within a breast pocket. Although the described embodiments are metal, other materials may be used, such as plastic or wood.

The present invention is described in terms of specifically-described embodiments. Those skilled in the art will recognize that alternative embodiments of such device can be used in carrying out the present invention. Other aspects and advantages of the present invention may be obtained from a study of this disclosure and the drawings, along with the appended claims.

I claim:

1. A measuring apparatus comprising:
   a body having a first end, an opposing second end, and a longitudinal reference line extending between the first end and the second end;
   a first pair of parallel surfaces of equal length, the first pair of opposing parallel surfaces longitudinally between the first end and the second end and parallel to the reference line, the surfaces of the first pair spaced apart by a first distance;
   a second pair of parallel surfaces of equal length, the second pair of parallel surfaces longitudinally between the first pair of parallel surfaces and the first end, the surfaces of the second pair spaced apart by a second distance that is smaller than the first distance;
   a surface positioned substantially perpendicular to the reference line and adjoining one surface of said first pair of parallel surfaces and one surface of said second pair of parallel surfaces; and
   a pair of nonparallel surfaces connected at an obtuse angle, the opposing nonparallel surfaces longitudinally between the second pair of opposing parallel surfaces and the first end.

2. The measuring apparatus of claim 1 wherein the second pair of parallel surfaces are parallel to the first pair of parallel surfaces.

3. The measuring apparatus of claim 1 wherein the lengths of the second pair of parallel surfaces is equal to the lengths of the first pair of parallel surfaces.

4. The measuring apparatus of claim 1 further comprising a third pair of parallel surface of equal length, the third pair of parallel surfaces longitudinally between the second pair of parallel surfaces and the pair of nonparallel surface.

* * * * *